United States Patent [19]

Costello

[11] Patent Number: 4,612,959

[45] Date of Patent: Sep. 23, 1986

[54] VALVELESS SHUT-OFF AND TRANSFER DEVICE

[75] Inventor: Walter H. Costello, Wenonah, N.J.

[73] Assignee: Mobil Oil Corporation, New York, N.Y.

[21] Appl. No.: 731,434

[22] Filed: May 7, 1985

[51] Int. Cl.[4] .............................................. F15C 1/04
[52] U.S. Cl. ..................................... 137/828; 137/74; 137/251.1; 138/37; 138/89; 73/23.1; 73/864.81
[58] Field of Search ..................... 138/89, 37; 137/74, 137/DIG. 10, 828; 251/11; 73/23.1, 864.91, 863.86, 864.81

[56] References Cited

U.S. PATENT DOCUMENTS

| | | | |
|---|---|---|---|
| 1,144,306 | 6/1915 | Mock | 138/37 |
| 1,844,367 | 2/1932 | Pirani et al. | 137/74 |
| 1,921,809 | 8/1933 | Crain | 138/89 |
| 3,063,286 | 11/1962 | Nerheim | 73/23.1 |
| 3,528,449 | 9/1970 | Witte et al. | 137/251 |
| 3,800,593 | 4/1974 | Bradley | 73/864.81 |
| 4,089,207 | 5/1978 | Patton | 73/864.81 |
| 4,206,650 | 6/1980 | Berber et al. | 73/864.81 |
| 4,296,637 | 10/1981 | Calamur et al. | 73/864.91 |

Primary Examiner—A. Michael Chambers
Attorney, Agent, or Firm—Alexander J. McKillop; Michael G. Gilman; Charles J. Speciale

[57] ABSTRACT

A valveless gas shut-off and transfer device has a looped conduit with a solder-like material in the loop. This eutectic material solidifies below its critical temperature to block the conduit and is liquefied above its critical temperature to allow passage of gas through the conduit. Baffles on the outlet retain the liquefied solder when gas is passing through the device. The liquid solder flows back to the loop when pressures at the inlet and outlet are equalized. When the solder solidifies, the device is again blocked.

7 Claims, 5 Drawing Figures

VALVELESS SHUT-OFF AND TRANSFER DEVICE

BACKGROUND OF THE INVENTION

This invention relates to a liquid shut-off and transfer device and more particularly, to a device which contains no valve mechanism.

Often, it is important to minimize the internal volume of a gas transfer line. The transfer of a high pressure gas, usually at an elevated temperature, without the use of a valve is desirable. Valves or fittings, such as a "Tee" fitting generally have deadend portions. Gas being transferred is diluted with previous gas trapped in the dead end pockets.

Particularly in analytical measurements, such as gas chromatography, the elimination of such deadend pockets is important. Since the volume of gas being analytically measured is usually quite small, it is important to minimize the internal volume of the gas transfer line.

Solder and solder-like materials are well known. These are referred to herein as "eutectic" materials, meaning that they solidify below a critical temperature and liquify above a critical temperature, which critical temperature is within a range which can be easily controlled to selectively liquify or solidify the eutectic material. Fusible plugs of eutectic material are used in safety-related devices such as over temperature protection in gas cylinders, or to permit a flow of water into the sprinkler heads. These are "one shot" devices which cannot be reclosed.

It is an object of the present invention to provide a valveless transfer line which minimizes internal volume and has no "deadend" pockets.

It is another object of the present invention to use a eutectic material as the shut-off element in a transfer line.

SUMMARY OF THE INVENTION

The shut-off and transfer device of the present invention has a conduit with a loop which contains a eutectic material, i.e., solder or a solder-like material. The material solidifies below its critical temperature to block the loop and liquifies above its critical temperature to open the conduit to the passage of gas. A baffled enclosure between the loop and the outlet of the conduit contains baffles which retain the material in the loop when gas is passing through it. When the pressures at the inlet and the outlet of the conduit are equalized, the liquid material returns to the loop where it solidifies, thereby again shutting off the device. In accordance with the present invention, the internal volume of the transfer conduit is minimized. Also, the looped conduit has no deadend portions as generally found in valves or fittings so that gas being transferred is not diluted with any previous gas trapped in deadend pockets.

The shut-off and transfer device of the present invention has particular applicability to transferring gas from a shaker bomb, typically used to prepare mixtures of hydrocarbon oil and catalyst, to an analytical instrument such as a gas chromatograph. The transfer device of the present invention is easily attached to the shaker bomb in a manner which presents no problem during the heating and vigorous shaking to which the bomb is subjected during preparation of the mixture. Thereafter, the bomb is quenched with water to cool the bomb, stopping the reaction, and resolidifying the solder material in the loop. The capped end of the loop is unsecured from the bomb, the cap removed, and the free end is fitted with a baffle and a line to means for transferring the gas in the bomb to an analytical instrument, such as the gas chromatograph system. In this matter, small quantities of gas are reliably transferred from the shaker bomb to the gas chromatograph without contamination by other gases which might otherwise be trapped in the valves interconnecting the bomb with the analytical instrument.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
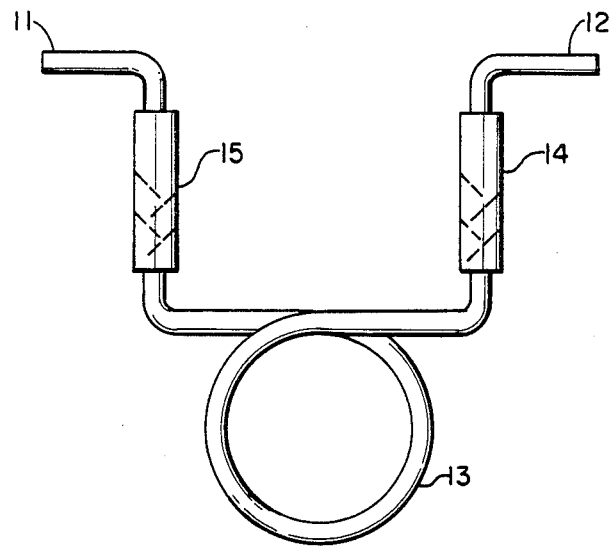
FIG. 1 shows the valveless shut-off and transfer device of the present invention.

Referring to FIG. 1, the shut-off and transfer device of the present invention includes a conduit having an inlet 11 and an outlet 12. A loop 13 in the conduit contains a eutectic material which solidifies below its critical temperature to block the loop and liquidifies above its critical temperature to open the conduit to the passage of fluid, typically gas. A baffled enclosure 14 is between loop 13 and the outlet 12. The enclosure contains baffles which retain the eutectic material during the time that it is liquefied and gas is passing through the conduit. A similar baffle enclosure 15 may be provided on the inlet side, but is not necessary.

Figure 2:
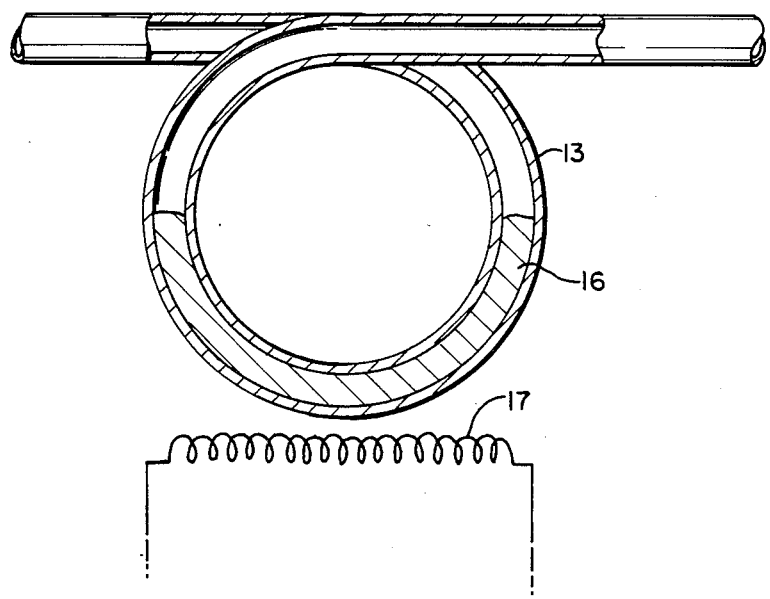
FIG. 2 is a cross-section of the loop.

FIG. 2 shows a cross section of the conduit wherein the solder or the solder-like material 16 is solidified in the loop. A heater 17, or a furnace, provides means for controlling the temperature of the material above and below its critical temperature.

Tin-lead solders which have a melting temperature between 240° F. to approximately 1,000° F. are suitable for use. In the shaker bomb application, to be subsequently described, care must be taken to use a solder which will not contaminate the gas. For example, it has been found that some silver solders can catalytically change the composition of the gas to be analyzed. On the other hand, most tin-lead solders are sufficiently inert to be usable.

The looped conduit of the present invention can be made, for example, from 1/16 inch OD stainless steel tubing with a 0.020 inch ID, which has an internal volume of only 0.005 cc per inch of length. An even smaller tube of 0.010 inch OD by 0.004 ID has only 0.0002 cc/inch of length. Internal volume of the transfer line can be reduced even further by eliminating the baffle 15 on the high-pressure end because gas flow will be away from that end.

Figure 3:
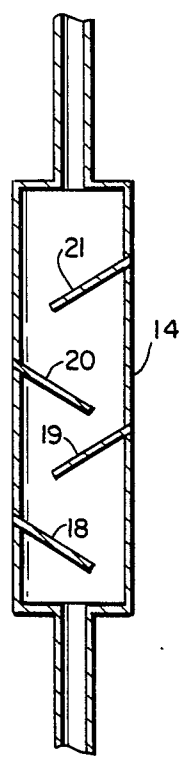
FIG. 3 is a cross-section of the baffled enclosure.

FIG. 3 shows a cross-section of the stainless steel baffled enclosure wherein baffle plates 18–21 retain the liquid during gas transfer.

Figure 4:
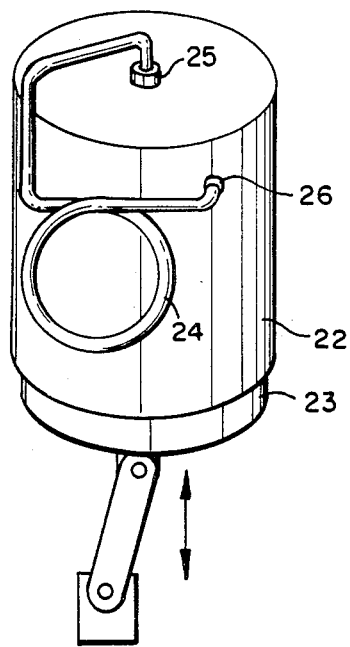
FIG. 4 shows the transfer device of the present invention attached to a shaker bomb during preparation of a catalyst and oil mixture.
Figure 5:
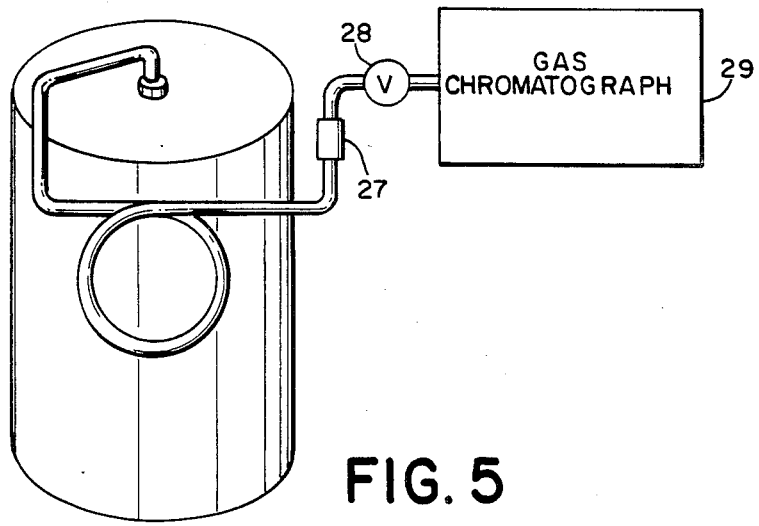
FIG. 5 shows the contents of the shaker bomb being transferred to a gas chromatograph by the transfer device of the present invention.

Referring to FIG. 4, a shaker, or sample, bomb 22 is typically a sealed vessel of approximately 1,000 cc. In exemplary use, a mixture of catalyst and heavy oil is placed in the vessel which is sealed. The vessel is heated. Simultaneously, vigorous shaking, as by the reciprocating piston 23, is applied to the shaker bomb. The inlet end of the loop 24 is connected to the top outlet 25 of the shaker bomb. A cap 26 closes the other end. The transfer device of the present invention is securely fastened to the shaker bomb so that it can be subjected to its normal heat and violent shaking. After a designated reaction time at specified temperatures, generally 300° F., to 1,000° F., the bomb is quenched with water to cool it rapidly, thereby stopping the reaction of the contents. This also solidifies the eutectic material in the loop at 24.

After the bomb is quenched, the cap 26 is removed from the bomb and the free end is fitted with a baffled enclosure 27. A restrictor valve 28, or capillary restrictor, connects baffled enclosure 27 to the gas chromatograh 29.

While a particular embodiment of the invention has been shown and described, various modifications are within the true spirit and scope of the invention. The appended claims are, therefore, intended to cover all such modifications.

What is claimed is:

1. A shut-off and transfer device comprising:
a conduit having an inlet and an outlet;
a loop in said conduit;
a eutectic material in said loop, said material solidifying below its critical temperature to block said loop, and liquefying above said critical temperature to open said conduit to the passage of fluid therethrough;
a baffled enclosure being connected to the outlet of said conduit, having baffles therein which retain said eutectic material when it is liquefied and fluid is passing through said device, said eutectic material flowing back into said loop when the pressure at said inlet and said outlet are equalized; and
means for controlling the temperature of said material above and below said critical temperature.

2. The device recited in claim 1 wherein said means for controlling the temperature of said material comprises a heater for heating said eutectic material above its critical temperature.

3. A method of transferring the contents of a sample bomb to an analytical instrument comprising:
attaching the inlet end of a looped conduit to the outlet of said bomb, said looped conduit containing a eutectic material which solidifies below its critical temperature to block said loop and liquefies above said critical temperature to open said conduit;
preparing the contents of said bomb for analysis in said instrument;
quenching said looped conduit with water;
attaching the outlet of said looped conduit to means connected to said analytical instrument; and
heating said looped conduit above the critical temperature of said eutectic material to liquefy it, thereby permitting passage of the contents of said bomb to said analytical instrument.

4. The transfer device and sampling bomb of claim 3 further comprising:
a cap on the outlet of said conduit, said cap being removable so that said outlet of said conduit can be connected to an analytical device and said eutectic material can be heated above its critical temperature to permit transfer of the contents of said sampling bomb to said analytical device.

5. A method of transferring the contents of a sample bomb to an analytical instrument comprising:
attaching the inlet end of a looped conduit to the outlet of said bomb;
preparing the contents of said bomb for analysis in said instrument;
quenching said looped conduit with water;
attaching the outlet of said looped conduit to means connected to said analytical instrument, said looped conduit containing a eutectic material which solidifies below its critical temperature to block said loop and liquefies above said critical temperature to open said conduit; and
heating said looped conduit above the critical temperature of said eutectic material to liquefy it, thereby permitting passage of the contents of said bomb to said analytical instrument.

6. The method recited in claim 5, further comprising:
capping the outlet of said looped conduit with a cap during the step of preparing; and
removing said cap prior to attaching the outlet of said looped conduit to means connected to said analytical instrument.

7. The method of analyzing hydrocarbon oil comprising:
mixing hydrocarbon oil and a catalyst in a sample bomb;
attaching the inlet end of a closed conduit to the outlet of said bomb, said conduit containing a eutectic material which solidifies below its critical temperature to block said loop and liquefies above said critical temperature to open said conduit to the passage of gas;
heating said sample bomb and vigorously shaking it;
quenching said sample bomb in water to stop the reaction of catalyst and oil and to solidify said eutectic material;
attaching the outlet of said sample loop to means connected to an analytical instrument;
heating said sample loop to liquify said eutectic material thereby allowing gas from said sample bomb to pass to said analytical instrument; and
measuring the properties of said gas in the said analytical instrument.

* * * * *